| United States Patent [19] | [11] Patent Number: 4,977,468 |
|---|---|
| Aruga et al. | [45] Date of Patent: Dec. 11, 1990 |

[54] TAPE EDGE DETECTING METHOD AND DEVICE THEREFOR

[75] Inventors: Mutsumi Aruga, Nagano; Niro Nakamichi, Tokyo, both of Japan

[73] Assignees: Kabushiki Kaisha Sankyo Seiki Seisakusho, Nagano; Nakamichi Corporation, Tokyo, both of Japan

[21] Appl. No.: 465,655

[22] Filed: Jan. 22, 1990

Related U.S. Application Data

[63] Continuation of Ser. No. 106,220, Oct. 9, 1987, abandoned.

[30] Foreign Application Priority Data

Oct. 9, 1986 [JP] Japan .................................. 61-240270

[51] Int. Cl.$^5$ .............................................. G11B 21/10
[52] U.S. Cl. ..................................... 360/75; 360/77.12
[58] Field of Search ............................... 360/75, 77.12

[56] References Cited

U.S. PATENT DOCUMENTS 4,055,849 10/1977 Hickok .................................. 360/77
4,476,503 10/1984 Solhjell ................................ 369/56
4,633,344 12/1986 Jeffers ................................. 360/77

FOREIGN PATENT DOCUMENTS 60-40522   3/1985  Japan .
60-45930   3/1985  Japan .
60-175267  9/1985  Japan .
62-46421   2/1987  Japan .
62-78713   4/1987  Japan .

Primary Examiner—Robert L. Richardson
Assistant Examiner—David L. Robertson
Attorney, Agent, or Firm—Sughrue, Mion, Zinn, Macpeak & Seas

[57] ABSTRACT

A tape edge detecting device in which a head unit comprising a writing head and two reading heads, arranged in the widthwise direction of a magnetic tape are provided so that they are movable in the widthwise direction of the magnetic tape in order to detect signals recorded on the magnetic tape, and which also includes a comparison means for comparing the outputs of the reading heads. The edge of the magnetic tape is detected using the output of the comparison means.

6 Claims, 2 Drawing Sheets (a)

(b)

TAPE EDGE DETECTING METHOD AND DEVICE THEREFOR

This is a continuation of application Ser. No. 106,220 filed Oct. 9, 1987, now abandoned.

BACKGROUND OF THE INVENTION

Field of the Industrial Application

This invention relates to a tape ,edge detecting system for detecting an edge of a magnetic tape which is used as a data-signal-recording medium. The system is applicable for instance to a tape drive device for data backup in a disk device.

DESCRIPTION OF THE PRIOR ART

In the backup of recorded data in a disk device, a tape drive device is used which has a magnetic tape with a number of tracks as a recording medium (cf. Japanese Patent Application Publication No. 101061/1984). When a new magnetic tape (on which nothing is recorded yet) is used by such a tape drive device, it is necessary to detect the position of a tape edge because a track position is determined from the tape edge.

A tape edge detecting system has been disclosed in U.S. Pat. No. 4,476,503. In that tape edge detecting system, a head unit 4 is used which comprises a writing head 2 and a reading head 3 which, as shown in FIG. 8, are arranged respectively upstream and downstream of a magnetic tape 1. The head unit 4 is moved in the widthwise direction of the magnetic tape 1 while a predetermined signal which was written on the magnetic tape 1 with the writing head 2 is being read with the reading head 3. The signal thus read is amplified by an amplifier 5, rectified by a rectifier circuit 6, and integrated by an integrating circuit 7 as shown in FIG. 7. The output integration signal of the integrating circuit is applied to a comparator 8, where it is compared with a reference voltage outputted by a reference voltage source 9. When the gap of the reading head 3 is in contact with the magnetic tape, the output level of the integrating circuit 7 is high; and when the gap is moved out of contact with the tape 1, the output level of the integrating circuit 7 is low. Therefore, if the comparator is so designed that its output is inverted when the gap of the reading head 3 goes across an edge of the magnetic tape, then the edge of the magnetic tape can be detected.

According to the magnetic tape standard, the output level of a magnetic tape is allowable in a predetermined range. Therefore, the output of a magnetic tape may fluctuate in the allowable range. For instance, according to the ¼ inch cartridge tape ISO standard, the output level is allowable in a range of from +50% to −35% relative to the ISO standard value. As a result, even if the same signals are recorded under the same conditions, the output level may be different within a range of from +50% to −35%, depending upon the tape employed. Therefore, in the conventional tape edge detecting system in which the output level of the reading head is compared with the reference voltage, the point where the output of the comparator is inverted is not fixed because of the fluctuation in output level of a cartridge tape, as a result of which it is impossible to detect the tape edge as required.

SUMMARY OF THE INVENTION

Accordingly, an object of this invention is to eliminate the above-described difficulty accompanying a conventional tape edge detecting system. More specifically, an object of the invention is to provide a tape edge detecting method or device in which a tape edge detection is free from the fluctuation in output level of a magnetic tape, and can be achieved with high accuracy and with high reliability.

The foregoing object of the invention has been achieved by the provision of a tape edge detecting device in which a head unit comprising a writing head and two reading heads arranged in the widthwise direction of a magnetic tape for detecting signals recorded on the magnetic tape is provided in such a manner as to be movable in the widthwise direction of the magnetic tape. A comparison section for subjecting the outputs of the two reading heads to comparison is provided.

Furthermore, according to the present invention, a tape edge detecting method comprises the steps of: moving a head unit having a writing head for recording signals on a magnetic tape and at least two reading heads for reading out signals recorded on the magnetic tape, in the widthwise direction of the magnetic tape; recording signals on the magnetic tape with the writing head, the magnetic tape running; reading the signals recorded on the magnetic tape by the writing head with the reading heads; comparing outputs of the reading heads; and detecting the tape edge in accordance with the result of the comparison.

The head unit is brought into sliding contact with a magnetic tape. A predetermined signal, while being recorded on the magnetic tape, is read by the two reading heads. When both of the reading heads are in contact with the magnetic tape, the output levels of the two reading heads are substantially equal. However, when one of the two reading heads loses contact with the magnetic tape, the outputs of the two reading heads become different from each other. Therefore, if the comparison section is so designed that its output is inverted when the output of one of the reading heads which loses contact with the magnetic tape becomes some percent of the output of the other reading head, then when the former reading head crosses the tape edge the output of the comparison section is inverted; that is, the tape edge can be detected from the inversion of the output of the comparison section.

DETAILED DESCRIPTION OF THE PREFERRED EMBODIMENTS

One embodiment of a tape edge detecting device according to this invention will now be described.

Figure 2:
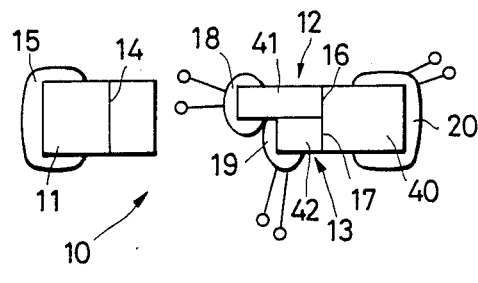
FIG. 2 is a front view showing one example of a head unit in the invention.
Figure 3:
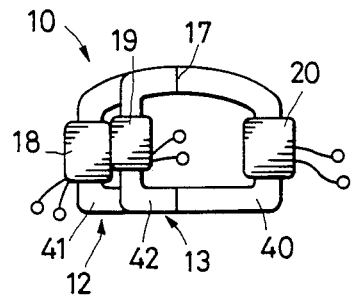
FIG. 3 is a bottom view showing reading heads in the head unit shown in FIG. 2.
Figure 4:
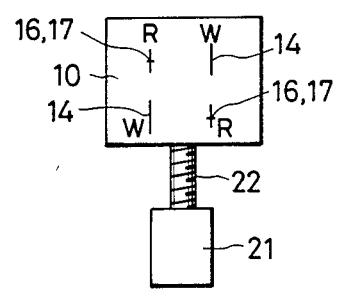
FIG. 4 is a front view showing one example of a mechanism for driving the head unit.

FIGS. 2 through 4 show examples of a head unit used in the tape edge detecting system of the present invention. In FIGS. 2 through 4, a head unit 10 comprises one writing head 11 and two reading heads 12 and 13. The writing head 11 has a head gap 14 and a writing coil 15. The two reading heads 12 and 13 have head gaps 16 and 17, and reading coils 18 and 19, respectively. The reading heads also have a data reproduction coil 20. The two reading heads 12 and 13 are formed by attaching two cores 41 and 42 having a small width to a core 40 of a data reproduction head, with forming gaps 16 and 17 therebetween. On the core 40, the coil 20 is wound. On the cores 41 and 42, the coils 18 and 19 are wound. The reading heads 12 and 13 are arranged in the widthwise direction of a magnetic tape. The writing head 11 and the reading heads 12 and 13 are arranged in the tape running direction. The gaps 16 and 17 of the reading heads 12 and 13 are brought into sliding contact with a magnetic tape in the slide contact range of the gap 14 of the writing head 11 so that a signal recorded on the magnetic tape by the writing head 11 is detected by the reading heads 12 and 13. The provision of two reading heads for one writing head is to permit an automatic azimuth adjustment or automatic tracking adjustment, as will be described later.

The head unit 10, as shown in FIG. 4. is threadably engaged with a lead screw 22 which is driven by a stepping motor 21. That is, the head unit 10 is moved in the widthwise direction of the magnetic tape (up and down in FIG. 4) by the stepping motor 21. In the case of FIG. 4, a pair of head units each comprising one writing head and two reading heads are combined into one unit, so that a track is used for a writing or reading operation when a magnetic tape is run in the forward direction and another track is used for a writing or reading operation when the magnetic tape is run in the reverse direction.

Figure 1:
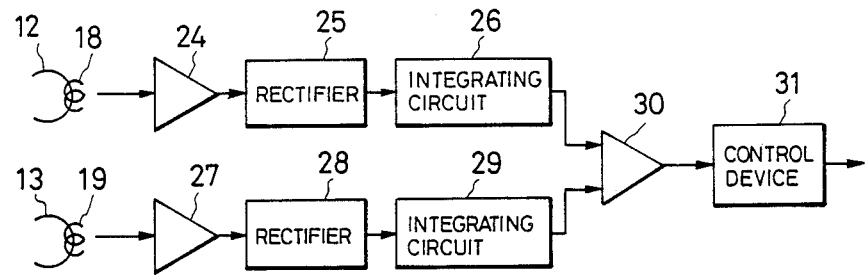
FIG. 1 is a block diagram showing one example of a signal processing device or method which can be employed for this invention.

As shown in FIG. 1, the output signal of the coil 18 of the reading head 12 is amplified by an amplifier 24, rectified by a rectifier circuit 25, and integrated by an integrating circuit 26. Similarly, the output signal of the coil 19 of the reading head 13 is amplified by an amplifier 27, rectified by a rectifier circuit 28, and integrated by an integrating circuit 29. The integrated outputs of the two reading heads 12 and 13 thus treated are compared with each other in a comparison section 30, the comparison output of which is applied to a control device 31. The output level of the reading head 12 is decreased to a 10% level before being applied to the comparison section 30, so that the output of the comparison section 30 is inverted when the output of the reading head 13 becomes lower than that level. The control device 31 controls the stepping motor 21 in FIG. 4 or other suitable operating components.

Figure 5:
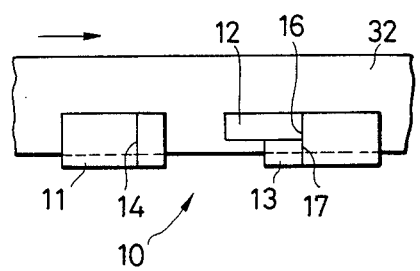
FIG. 5 is a front view for a description of a tape edge detecting operation using the head unit.

As shown in FIG. 5, the head unit 10 is brought into sliding contact with a magnetic tape 32 which is being run, in such a manner that the writing head 11 is located upstream of the tape 32 and the reading heads 12 and 13 are located downstream of the tape 32. The head unit 10 is movable in the widthwise direction of the magnetic tape 32 by means of the stepping motor 21.

Figure 6:
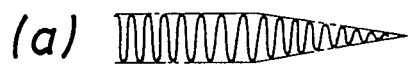
FIG. 6, consisting of (a) and (b) is a waveform diagram showing examples of signals outputted by the two reading heads of the head unit.
Figure 6:
Figure 7:
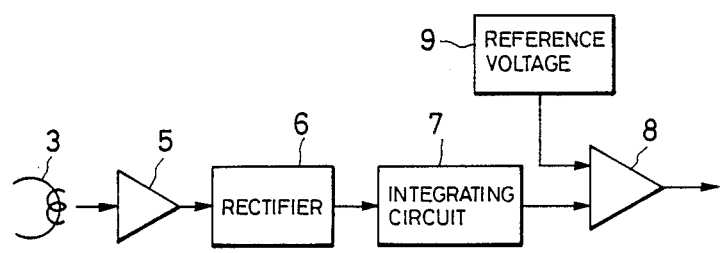
FIG. 7 is a block diagram showing one example of a signal processing circuit employed in a conventional tape edge detecting system.
Figure 8:
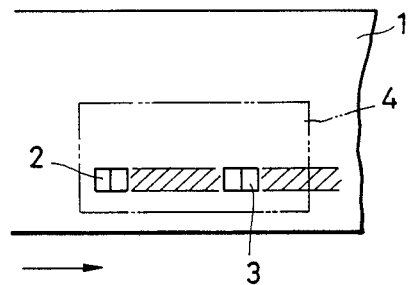
FIG. 8 is a front view outlining an example of a head unit used in the conventional tape edge detecting system.

While both of the reading heads 12 and 13 are kept in sliding contact with the magnetic tape 32, the output levels of the reading heads 12 and 13 are equal. Accordingly, even when, in this case, the output level of one of the reading heads is compared with a reference level, i.e., 10% of the output level of the other reading head, the output of the comparison section is maintained unchanged. When the head unit 10 is moved in the widthwise direction of the magnetic tape to cause the gap of one of the reading heads to come to the edge of the magnetic tape, the output of the reading head is gradually attenuated as shown in the part (a) of FIG. 6 whereas the output of the other reading head which is away from the tape edge is maintained unchanged (not attenuated)as shown in the part (b) of FIG. 6. When, in this case, the output of the former reading head on the tape edge becomes equal to or lower than 10% of the output of the latter reading head, the output of the comparison section 30 is reversed. Accordingly, the position where the output of the comparison section 30 is reversed is at the edge of the tape 32. Thus, the track position can be determined from the edge thus detected.

It is assumed that, in the case of FIG. 5, the head unit 10 is moved below from the middle of the tape, in the widthwise direction of the magnetic tape 32. When the head unit 10 reaches the edge of the tape 32, the output of the lower reading head 13 is attenuated as shown in the part (a) of FIG. 6, whereas the output of the upper reading head 12 is maintained unchanged as shown in the part (b) of FIG. 6. Therefore, the comparison section 30 compares the output of the upper reading head 13 with the reference value, i.e., 10% of the output of the upper reading head 12, to output an edge detection signal.

As was described above, in the case where the head unit 10 is moved outwardly from the middle of the magnetic tape 32, in the widthwise direction, the output level of one of the reading heads is compared with the references level which is 10% of the output level of the other reading head in the comparison section 30, for detection of the tape edge. The detection of the tape edge can also be achieved where the two reading heads 12 and 13 are moved towards the middle, in the widthwise direction of the magnetic tape 32 from outside. In this case, first the outputs of the two reading heads are zero, and they cannot be subjected to comparison. When, with the gap of one of the reading heads in sliding contact with the magnetic tape 32, the gap of the other head reaches the tape edge, the outputs of the two reading heads are subjected to comparison. In this case, the comparison circuit is so designed that its output is inverted when the output level of the reading head which is last to contact the magnetic tape reaches, for instance, 10% of the output level of the reading head which contacts the magnetic tape first. That is, the tape edge is detected when the output of the comparison section 30 is inverted.

In the above-described embodiment, the output of one of the two reading heads is employed as a reference value, and the output of the other reading head is compared with the reference value, to detect the tape edge. Therefore, in the embodiment, the tape edge detection is not affected by the fluctuation in output level of a magnetic tape. Thus, the tape edge detection can be performed with high accuracy and with high reliability.

The tape edge detecting method of the invention is applicable not only to a tape drive device for data backup in a disk device but also other devices using magnetic tapes.

Furthermore, in the present invention, since the two reading heads 12 and 13 are provided for the single writing head, the automatic azimuth adjustment and the automatic tracking adjustment can be performed, as will be described hereinafter.

When the automatic azimuth adjustment or the automatic tracking adjustment is performed, outputs of the two reading heads 12 and 13 are compared with each other, to detect whether the outputs are equal to each other or not. In the case where the outputs are different from each other, the control device 31 controls a stepping motor 21 so that the outputs will become equal to each other, to thereby adjust the position of the head unit 10.

Specifically, for the automatic tracking adjustment, the control device 31 controls the stepping motor 21 so that levels of the outputs of the reading heads 12 and 13 will be equal to each other, to adjust the position of the head unit 10. On the other hand, for the automatic azimuth adjustment, the control device 31 controls an azimuth adjustment mechanism (not shown in the drawing) so that phases of the output signals of the heads 12 and 13 will be equal to each other.

Therefore, according to the method or device of the present invention, when data is to be recorded on the magnetic tape, an edge of the tape is detected. Then, a position of a track where data is to be recorded is determined in accordance with the detected position of the tape edge. Furthermore, when data is read out from a magnetic tape, the two reading heads 12 and 13 are first positioned about at a track of the tape where the data to be read out are recorded. When the magnetic tape runs, data is read out from the magnetic tape with the reading heads 12 and 13. The coil 20 reproduces, the read out data, and meanwhile the data outputs of the coils 18 and 19 are compared with each other. On the basis of the comparison of the outputs of the coils 18 and 19, the stepping motor 21 is controlled by the control device 31 so that the outputs will become equal to each other, as a result of which the head unit 10 traces the track, to thereby perform automatic tracking operation.

What we claim is:

1. A method of detecting a tape edge using detector means which comprises a head unit including a writing head and two reading heads arranged in the widthwise direction of a magnetic tape, said writing head and said reading heads being arranged in the direction of movement of said magnetic tape, drive means for driving said head unit in the widthwise direction of said magnetic tape, comparison means for comparing outputs from said reading heads to each other, and detecting means for detecting an edge of said magnetic tape according to the output of said comparison means, the method comprising the steps of:

(a) when recording on said magnetic tape, moving said head unit in the widthwise direction of said magnetic tape with said driving means while running said magnetic tape in a direction from said writing head toward said reading heads;
    (b) recording signals on said magnetic tape with said writing head while moving said head unit;
    (c) reading said signals recorded by said writing head with said two reading heads;
    (d) comparing said signals read by said two reading heads with each other using said comparison means to obtain a comparison output; and
    (e) when positioning one of two said reading heads completely on said magnetic tape and the other one of said two reading heads almost completely off said magnetic tape while said head unit is moving, detecting said tape edge of said magnetic tape with said detecting means, wherein said detecting means detects said tape edge on a basis of said comparison output corresponding to a comparison of the two reading heads signals relative to one another, and determines said tape edge when a level of one of said two reading head signals becomes a predetermined percentage of the other of said two reading head signals.

2. A method as claimed in claim 1, further comprising the steps of:

when reading the signals recorded on said magnetic tape, positioning said two reading heads on a track on which said signals have been recorded, said track being provided on said magnetic tape;
    simultaneously when reading said signals with said two reading heads, comparing the outputs from said two reading heads with said comparing means;
    controlling said drive means according to the outputs of said comparison means; and
    allowing said two reading heads to follow said track of said magnetic tape to perform an automatic tracking operation.

3. A tape edge detecting device comprising:
    a head unit including a writing head and at least two reading heads arranged in the widthwise direction of a magnetic tape, said writing head and reading heads being arranged in the direction of movement of said magnetic tape;
    drive means for moving said head unit in the widthwise direction of said magnetic head;
    comparison means which compares output levels of said two reading heads relative to each other to obtain a comparison output;
    detecting means for detecting an edge of said magnetic tape from said comparison output, wherein said detecting means detects said tape edge on a basis of said comparison output corresponding to a comparison of the two reading heads signals relative to one another, and determines said tape edge when a level of one of said two reading head signals becomes a predetermined percentage of the other of said two reading head signals.

4. A tape edge detecting device comprising:
    a head unit including a writing head, and two reading heads arranged in the widthwise direction of a magnetic tape, said writing head and said reading heads being arranged in the direction of movement of said magnetic tape;
    drive means for driving said head unit in the widthwise direction of said magnetic tape;
    comparison means which compares output levels of said two reading heads relative to each other to obtain a comparison output; and
    detecting means for detecting an edge of said magnetic tape in accordance with said comparison output, wherein said detecting means detects said tape edge on a basis of said comparison output corresponding to a comparison of the two reading heads signals relative to one another, and determines said tape edge when a level of one of said two reading head signals becomes a predetermined percentage of the other of said two reading head signals;

whereby an edge of said tape is detected by said detecting means when data is to be recorded on said tape, and whereby an automatic tracking operation is performed by controlling said drive means in accordance with said comparison output so that said head unit will trace a track where data to be read out is recorded.

5. A tape edge detecting method as claimed in claim 1 or 2, in which each said reading head comprises: two core parts formed by slitting one end portion of a core member into two parts; and a respective winding wound on each of said two core parts.

6. A tape edge detecting device as claimed in claim 3 or 4, in which each of said reading heads comprises: two core parts formed by slitting one end portion of a core member into two parts; and a respective winding wound on each of said two core parts.

* * * * *